(12) United States Patent
Ward

(10) Patent No.: US 8,267,627 B1
(45) Date of Patent: Sep. 18, 2012

(54) LATCHING HITCH ANCHORING APPARATUS

(76) Inventor: Casey Ward, Lena, MS (US)

( * ) Notice: Subject to any disclaimer, the term of this patent is extended or adjusted under 35 U.S.C. 154(b) by 147 days.

(21) Appl. No.: 12/722,322

(22) Filed: Mar. 11, 2010

(51) Int. Cl.
B60P 7/08 (2006.01)

(52) U.S. Cl. .................................. 410/7; 410/3

(58) Field of Classification Search ................ 410/2, 3, 410/4, 7, 80; 224/403, 533, 552, 567, 404, 224/543, 547, 554; 248/500, 503
See application file for complete search history.

(56) References Cited

U.S. PATENT DOCUMENTS

| 3,531,140 | A | 9/1970 | Di Vita et al. |
| 4,758,015 | A | 7/1988 | Pixley |
| 5,746,275 | A | 5/1998 | Cross et al. |
| 6,050,737 | A | 4/2000 | Russell |
| 6,077,004 | A | 6/2000 | Denman, Jr. |
| 6,099,017 | A | 8/2000 | Schooler |
| 6,139,043 | A | 10/2000 | Gries et al. |
| 6,139,235 | A | 10/2000 | Vander Koy et al. |
| 6,450,472 | B1 | 9/2002 | Cook, Jr. |
| 6,481,739 | B1 | 11/2002 | Newkirk |
| 6,619,687 | B2 | 9/2003 | Goby |
| 7,147,415 | B2 | 12/2006 | Rorie et al. |
| 2005/0220557 | A1* | 10/2005 | Rorie et al. ........................ 410/7 |

* cited by examiner

Primary Examiner — Stephen Gordon
(74) Attorney, Agent, or Firm — Montgomery Patent & Design, LLC; Robert C. Montgomery; Joseph Yaksich

(57) ABSTRACT

An apparatus utilized to lock a transportable vehicle, such as an all terrain vehicle (ATV) to a bed of a transporting vehicle generally comprising a locking bar assembly and a locking mechanism assembly. The locking bar assembly is securely mounted to the front of the transportable vehicle. The locking mechanism assembly mounts to a forward vertical wall inside the bed of the transporting vehicle and includes a guiding feature that aligns with the locking bar assembly. The transportable vehicle is guided into place until the locking bar assembly engages the locking mechanism assembly. A locking arm is locks the locking mechanism assembly to the lock bar assembly, thereby securely holding the transportable vehicle.

20 Claims, 5 Drawing Sheets

LATCHING HITCH ANCHORING APPARATUS

RELATED APPLICATIONS

The present invention was first described in an Official Record of Invention on Nov. 5, 2008, that is on file at the offices of Montgomery Patent and Design, LLC, the entire disclosures of which are incorporated herein by reference.

FIELD OF THE INVENTION

The present invention relates generally to vehicle securing apparatus, and more particularly, to an apparatus for anchoring a small vehicle to a vertical support for transportation.

BACKGROUND OF THE INVENTION

All Terrain Vehicles or ATV's have enjoyed recent widespread popularity. They find use in almost all types of terrains from desert areas, wooded areas, and even use in areas covered with snow. They are used as part of one's job, for hunting, camping, search and rescue, general recreation, or just plain fun. Other small vehicles such as golf carts, riding lawn mowers, snowmobiles, and tractors are also utilized by many people in diverse locations and conditions for assorted purposes. Due to the varied uses of these vehicles, many riders are required to transport their vehicles to the location of use. Transportation of these vehicles is typically accomplished by loading the vehicle in the bed of a pickup truck or trailer. Once inside the bed, many users rely on tie down ropes, ratcheting straps, and other fastening means to hold the ATV in place during transport. While these methods work, they are prone to becoming loose or breaking, and their use takes a great deal of time to both apply and remove. Additionally, there is a danger of physical injury or damage to the transportable vehicle, the transporting vehicle, or nearby traffic. These problems can lead to many people to omit their use entirely.

Various other attempts have been made to secure small vehicles to transporting vehicles without the use of chains or straps. These attempts include the use of hitch plates, lock down assemblies, and tow bars with hitch docking assemblies. Such attempts prevent proper securement of the small vehicle and present problems with attaching the securing devices to the vehicles due to difficulties in properly positioning the vehicle in relation to the securing device. These attempts also require a large amount of time and effort, particularly when only a single person is trying to secure the vehicle.

Other attempts to secure the vehicle offer adjustable posts which are mounted to the flat bed surface which then anchor a hitch plate in some type of receiving assembly or jaw. These attempts can be seen by example in U.S. Pat. Nos. 6,077,004, issued in the name of Denman, Jr.; 6,450,472, issued in the name of Cook, Jr.; and 7,147,415, issued in the name of Rorie et al. These attempts also present problems for the user to utilize. It can be difficult for the user to align the hitch plate with the receiving assembly, often requiring repetitive trial and error to properly adjust the height of the receiver. Additionally, these post devices can fail under stresses and torque forces presented by the attached vehicle during transportation. These devices also take up valuable cargo floor space when not being used to anchor a small vehicle during transport. In addition, none of these attempts provide increased security from theft of the small vehicle when unattended.

The disclosures of the above referenced examples are incorporated herein by reference. Each of these prior attempts suffers from one (1) or more of the aforementioned disadvantage or deficiency with respect to design, function, or effectiveness. Accordingly, there exists a need for a means by which small vehicles can easily and quickly be attached to a transporting vehicle without the disadvantages as described above. The development of the present invention substantially departs from the conventional solutions and in doing so fulfills this need.

SUMMARY OF THE INVENTION

In view of the foregoing art, the inventor recognized the aforementioned inherent problems and observed that there is a need for a novel means to anchor a small transportable vehicle, such as an ATV, to a transporting vehicle, such as the bed of a pickup truck or trailer, which allows for quick attachment and removal, the object of the present invention is to solve the aforementioned disadvantages and provide for this need.

Another object of the present invention is to provide an apparatus which provides increased security against theft of the transportable vehicle when left unattended.

Another object of the present invention is to provide an apparatus in which the operation of the small vehicle is not affected and the appearance of the vehicle is not diminished.

Another object of the present invention is to provide an apparatus which can quickly be adjusted to fit the desired vehicle and allows the vehicle to be driven into place without unnecessary trial and error.

Yet another object of the present invention is to provide an apparatus which is simple and intuitive to use with little to no training and can be used effectively by a single user.

Yet another object of the present invention is to provide an apparatus which is simple and economical to manufacture.

Accordingly, the above objectives and advantages are achieved by an apparatus comprising features which provide a latching hitch anchoring apparatus for anchoring a small transportable vehicle to a vertical support of a transportable vehicle, such as a flat bed pickup truck or trailer. In a preferred embodiment, the apparatus comprises a mounting plate assembly attached to the forward vertical support of the transporting vehicle having a plurality of fastening features, a locking mechanism assembly attached to the mounting plate assembly having an alignment feature and a latching feature, and a locking bar assembly attached to a front frame portion of the transportable vehicle having a locking bar releasably secured to the latching feature.

The plurality of fastening features include at least four (4) fastening apertures located in each corner of a rectangular member to attach the mounting plate assembly to the vertical support and a pair of parallel adjustment slots extending perpendicular to the top edge of the vertical support which align with at least two (2) pairs of opposing fastening apertures located at each corner of the locking assembly to attach the locking assembly to the mounting assembly. The pair of adjustment slots provides a means to slidingly adjust the vertical position of the locking assembly in relation to the vertical support.

The alignment feature includes an open-faced five-sided member having a recessed area for receiving the locking bar and a lead-in plate which provides mechanical guidance to the locking bar and access to the latching feature during insertion of the locking bar.

The latching feature includes a pivot shaft extending the length of and rotatably attached to the five-sided member, at least one (1) pair of latching plates perpendicularly affixed to and spaced along the pivot shaft, parallel to one another for releasably securing the locking bar, and a locking arm affixed to an end of the pivot shaft in a substantially perpendicular orientation for rotating the pivot shaft.

In further embodiments the apparatus includes an elongated security tab affixed to the locking arm adjacent to an exterior surface of a side wall of the five-sided member having a locking aperture. The side wall also includes a locking aperture positioned such that the complimentary locking apertures align when the latching plates and the locking bar are engaged in order to receive a portable lock for increased security.

Furthermore, the described features and advantages of the invention may be combined in various manners and embodiments as one skilled in the relevant art will recognize. The invention can be practiced without one (1) or more of the features and advantages described in a particular embodiment.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
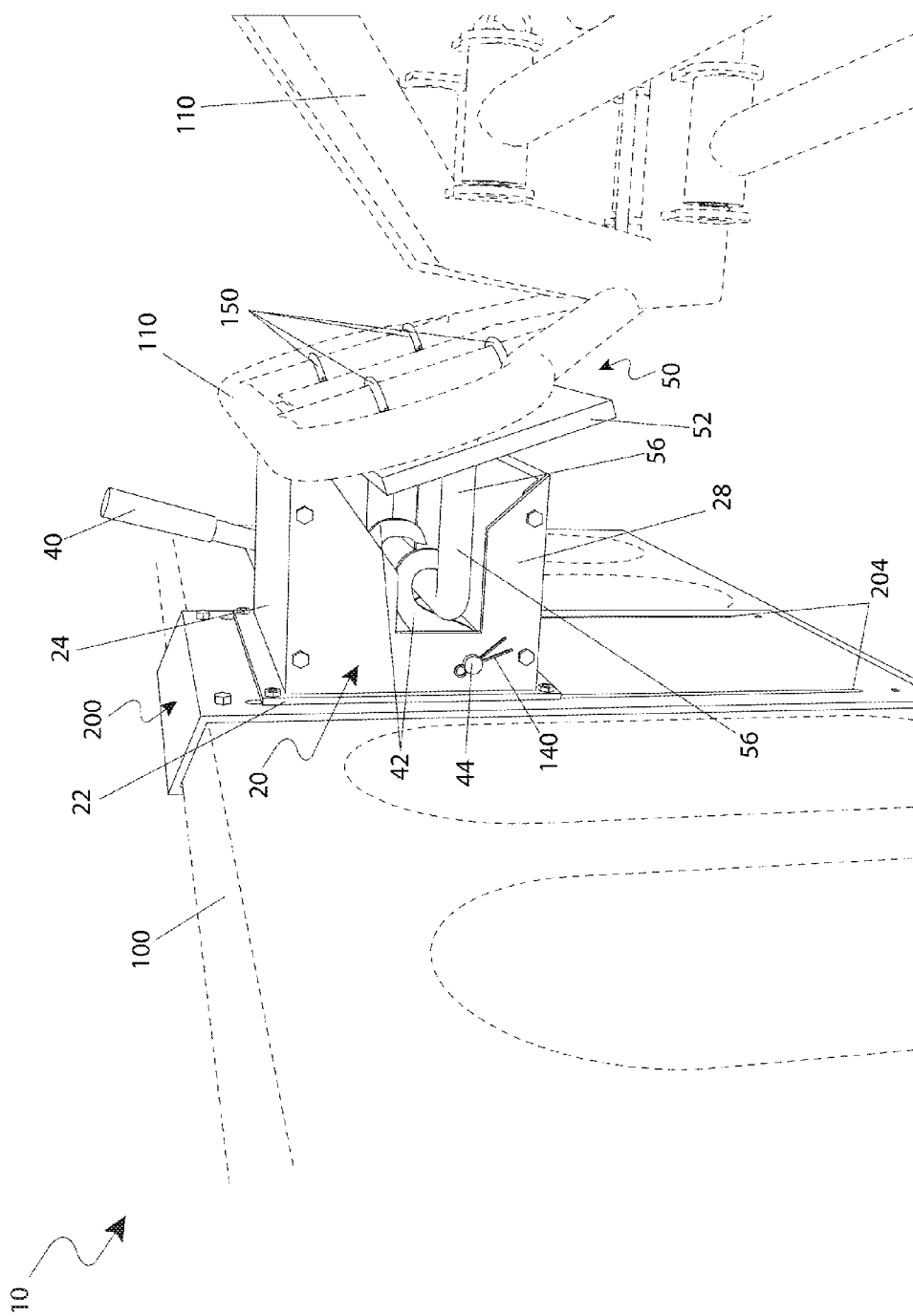
FIG. 1 is an environmental view of a latching hitch anchoring apparatus 10 being mounted to a pickup truck tailgate, according to a preferred embodiment of the present invention.

| | |
|---|---|
| 10 | latching hitch anchoring apparatus |
| 20 | locking mechanism assembly |
| 22 | back plate |
| 24 | top plate |
| 25 | lead-in plate |
| 26 | bottom plate |
| 28 | first side plate |
| 30 | second side plate |
| 31 | latching slot |
| 32 | fastening ear |
| 40 | locking arm |
| 42 | latch plate |
| 44 | pivot shaft |
| 45 | shaft notch |
| 46 | retainer plate |
| 47 | locking apertures |
| 50 | locking bar assembly |
| 52 | locking bar plate |
| 54 | fastening aperture |
| 56 | locking bar |
| 100 | transporting vehicle |
| 110 | transported vehicle |
| 120 | common fastener |
| 140 | cotter pin |
| 145 | security tab |
| 150 | "U"-bolt |
| 160 | nut fastener |
| 170 | weld |
| 200 | mounting plate assembly |
| 202 | hooking feature |
| 204 | adjustment slot |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a latching hitch for a latching hitch anchoring apparatus (herein described as the "apparatus") 10, which provides a means by which a transportable vehicle 110, such as an all-terrain vehicle (ATV), golf cart, lawn mower, or the like, is easily locked to a flat bed of a transporting vehicle 100, such as pickup truck. The apparatus 10 comprises a locking mechanism 20 and a locking bar assembly 50. In use, an operator simply pushes or drives a transportable vehicle 110 into place until the locking bar assembly 50 engages and securely latches into the locking mechanism 20. A user operated locking arm 40 provides manual latching and releasing of the transportable vehicle 110 from.

Referring now to FIG. 1, an environmental view of the apparatus 10, according to the preferred embodiment of the present invention, is disclosed. The apparatus 10 comprises a locking mechanism assembly 20 and a locking bar assembly 50. The locking mechanism assembly 20 bolts to a vertical wall portion of a transporting vehicle 100 such as an inside bed wall of a pickup truck and provides vertical adjustment via a slotted mounting plate assembly 200 (see FIG. 3). The locking mechanism assembly 20 comprises an angled lead-in plate feature 25 which aligns a locking bar portion 56 of the locking bar assembly 50 into the locking mechanism assembly 20 during engagement. The locking bar assembly 50 is affixed securely to front tubular frame portions of a transportable vehicle 110 such as an ATV using fasteners such as "U"-bolts 150. The locking mechanism assembly 20 comprises a pivoting locking arm 40 to manually latch the transportable vehicle 110 in place, thereby holding the transportable vehicle 110 securely during transport. Likewise, when the transportable vehicle 110 is to be released and unloaded, the locking arm 40 is simply pushed away from the transportable vehicle 110 and said transportable vehicle 110 is backed away.

Figure 2:
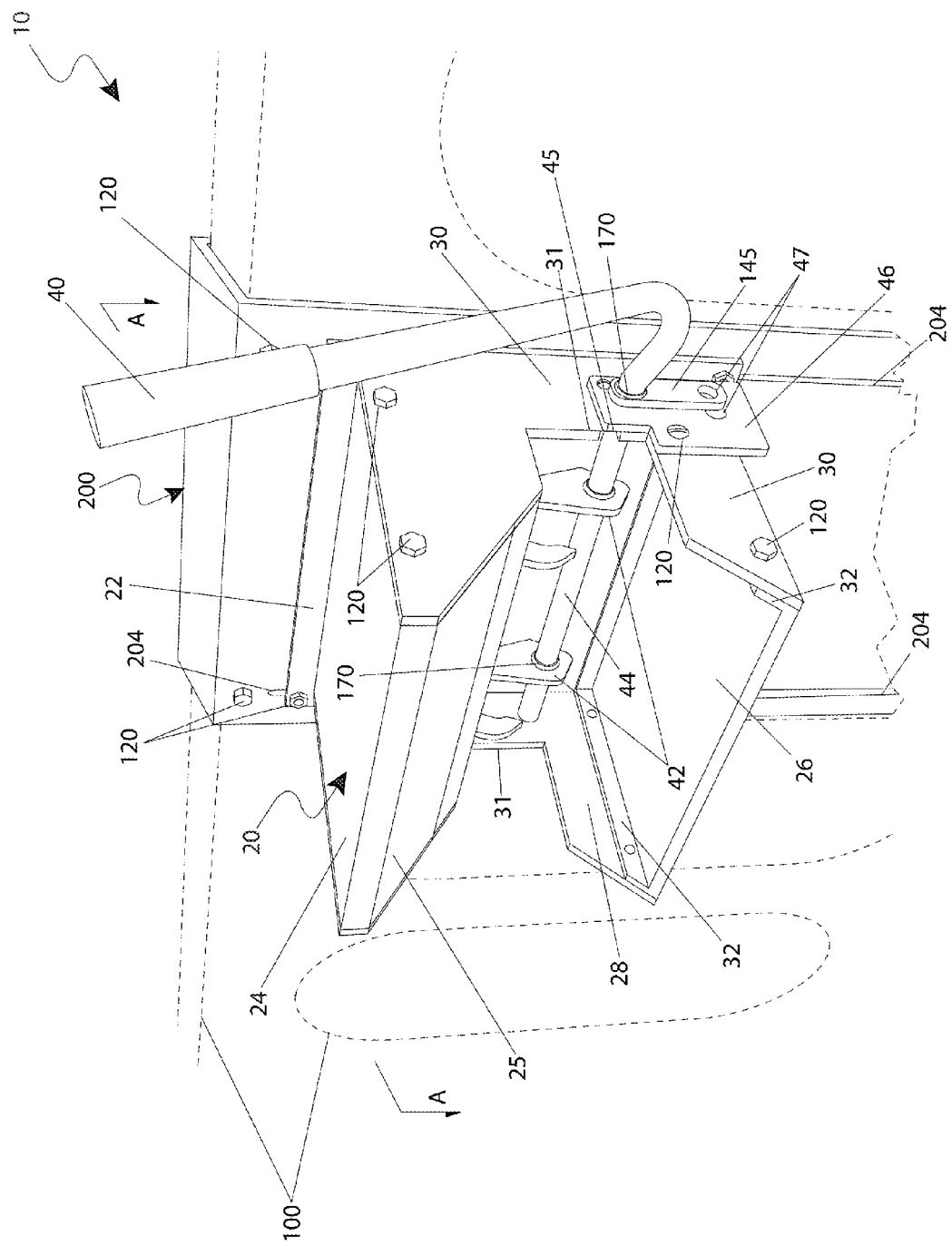
FIG. 2 is a close-up view of a locking mechanism assembly portion 20 of the latching hitch anchoring apparatus 10 being mounted to a pickup truck tailgate, according to a preferred embodiment of the present invention.

Referring now to FIG. 2, a close-up view of a locking mechanism assembly portion 20 of the apparatus 10, according to the preferred embodiment of the present invention, is disclosed. The apparatus 10 as illustrated here comprising a locking mechanism assembly 20 and a mounting plate assembly 200. The locking mechanism assembly 20 further comprises a top plate 24, a bottom plate 26, a first side plate 28, a second side plate 30, a locking arm 40, a pair of latch plates 42, a pivot shaft 44, and a retainer plate 46. The locking mechanism assembly 20 takes a form an open-faced five-sided metal box made using sturdy plated or painted steel plates being approximately one-quarter (¼) inch thick. The top 24 and bottom 26 plates are depicted here having pairs of fastening ears 32 formed at ninety (90) degrees along each outer edge thereof, thereby utilizing common fasteners 120 to provide a strong mechanical connection to adjacent side panels 28, 30. However, it is understood by those skilled in the art that the box assembly portion of the locking mechanism assembly 20 may also be assembled using welding processes without deviating from the concept and as such should not be considered a limiting factor of the apparatus 10.

Figure 3:
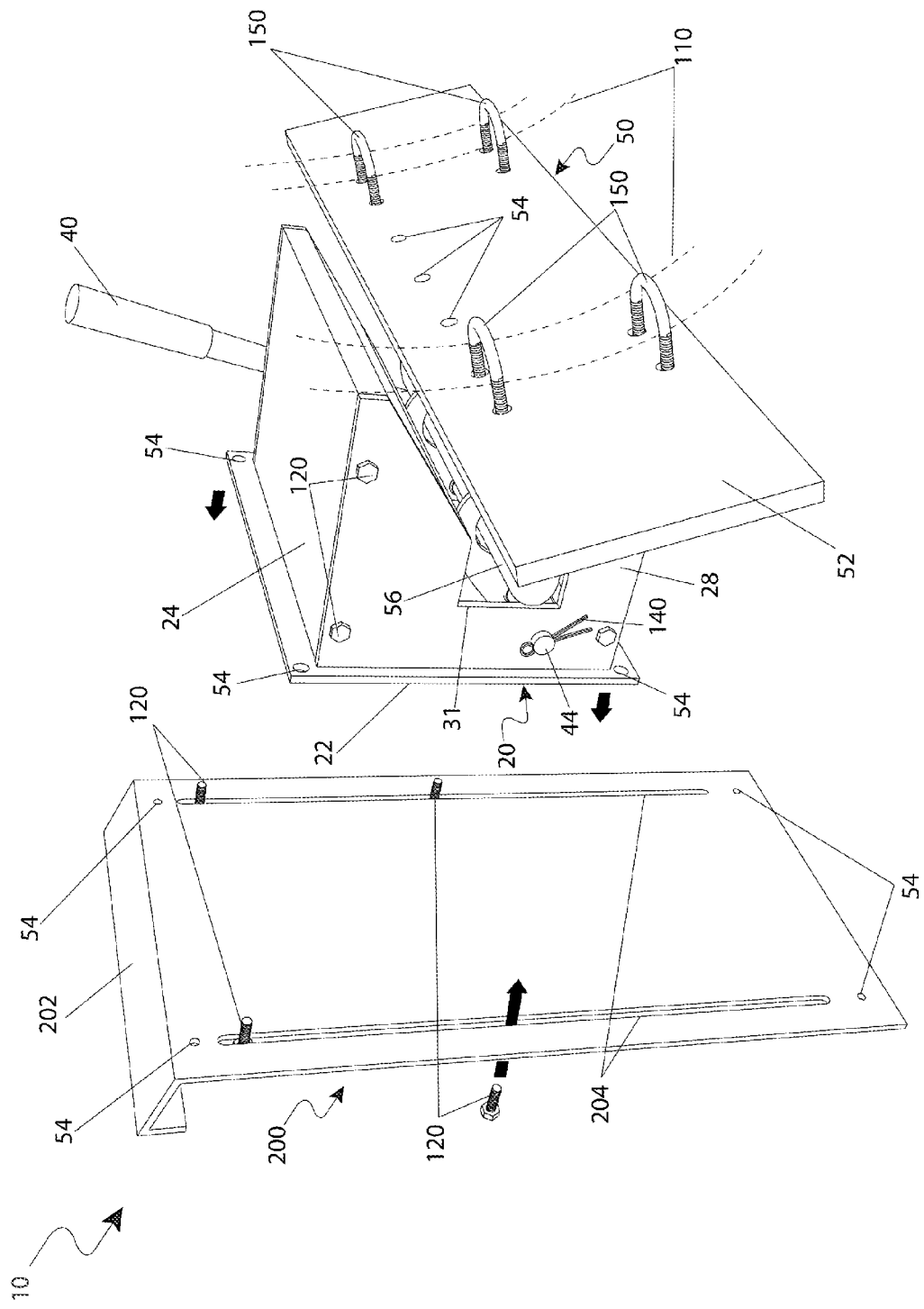
FIG. 3 is a perspective view of the latching hitch anchoring apparatus 10 depicting a detached mounting plate assembly portion 200, according to a preferred embodiment of the present invention.

The top plate 24 further comprises an angled lead-in plate 25 being welded to and protruding inwardly from an upper forward edge providing mechanical guidance to the locking bar 56 during engagement thereof (see FIG. 3).

The locking arm 40 provides a user a manual means to lock and release the locking bar 56 within the locking mechanism assembly 20. The locking arm 40 comprises an "L"-shaped solid or hollow cylindrical structure further comprising an upwardly extending grasping appendage being approximately twelve (12) inches long. The locking arm 40 further comprises a horizontal portion forming a pivot shaft portion 44 which extends an entire width of the locking mechanism assembly 20. The pivot shaft portion 44 provides a welded attachment means 170 to a pair of parallel latch plates 42 mounted along said pivot shaft 44 and being spaced approximately four (4) inches apart. Each latch plate 42 comprises a hook-shaped construction being designed to pivotingly entrap and hold the aforementioned locking bar 56 when said latch plates 42 are pivoted in a downwardly direction to engage said locking bar 56 (see FIG. 3).

The first 28 and second 30 side plates further comprise generally "V"-shaped latching slots 31 to further guide and entrap the locking bar 56 within the locking mechanism assembly 20. The second side plate 30 further comprises a rounded shaft notch 45 in a lower vertical edge of said latching slot to receive the pivot shaft 44 at a locking arm 40 end. The first side plate further comprises a shaft aperture to receive a distal end of said pivot shaft 44. The locking arm 40 and pivot shaft 44 comprise a unitary body for rotating said pair of latch plates 42 via said pivot shaft 44 freely rotating within the shaft notch 45 and the shaft aperture. The retainer plate 46 provides a means to attach the locking arm 40 and the pivot shaft 44 to the locking mechanism assembly 20 by mounting to an outer lower surface of the second side plate 30 using common fasteners 120. Removal of the retaining plate 46 enables removal of the locking arm 40 and pivot shaft 44 as a one-piece assembly from the shaft notch 45 and shaft aperture.

The locking arm 40 further provides a security means to protect against theft of the transportable vehicle 110 via a welded security tab 145 and integral drilled locking aperture 47. The security tab 145 comprises an oval-shaped steel plate being welded to the locking arm 40 adjacent to the second side plate 30. In a corresponding manner, the retaining plate 46 also comprises an aligned locking aperture 47 allowing insertion of a common padlock through the two (2) locking apertures 47, securing the locking arm 40 and locking bar 56 in a locked state.

Figure 4:
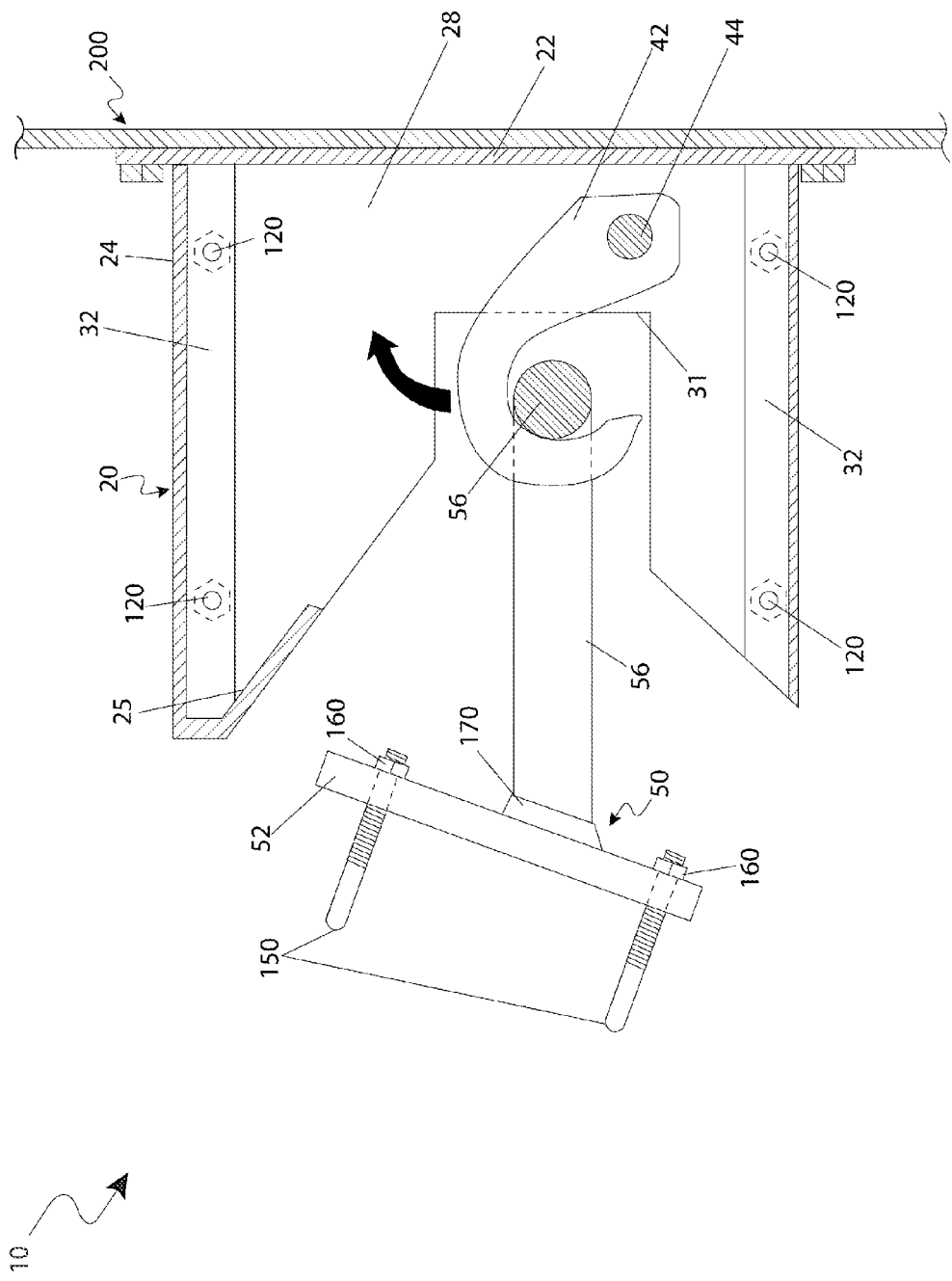
FIG. 4 is a section view of the locking mechanism assembly portion 20 of the latching hitch anchoring apparatus 10 taken along section line A-A (see FIG. 2), according to a preferred embodiment of the present invention; and, FIG. 5 is an exploded view of a locking bar assembly portion 50 of the latching hitch anchoring apparatus 10, according to a preferred embodiment of the present invention.

Referring now to FIGS. 3 and 4, perspective and section views of the apparatus 10 depicting engagement of a locking mechanism assembly 20 and a locking bar assembly 50, according to a preferred embodiment of the present invention, are disclosed. The locking bar 56 is illustrated here being secured within the latching slot portion 31 of the locking mechanism assembly 20 and securely held by the latch plates 42 (one shown here). Each latch plate 42 comprises a hook-shaped construction being designed to pivotingly entrap and secure the aforementioned locking bar 56. After insertion of the locking bar 56 into the two (2) latching slots 31, the latch plates 42 are pivoted downwardly about the pivot shaft 44 providing a latching engagement of said latch plates 42 around the locking bar 56, thereby locking the locking bar assembly 50 and transportable vehicle 110 in position.

The pivot shaft 44 is depicted here protruding through the first side plate 28 and being rotatingly attached using a common cotter pin 140 to provide lateral positioning of the locking arm 40 and pivot shaft 44.

The locking bar assembly 50 is illustrated here being affixed to the transportable vehicle using the aforementioned "U"-bolts 150. The locking bar assembly 50 is depicted here having the locking bar 56 being welded 170 to a locking bar plate portion 52 at a slight angle to conform to sloped frame portions of particular transportable vehicles 110; however, the locking bar assembly 50 is envisioned being provided in several models having a variety of included angles between the locking bar 56 and the locking bar plate 52 based upon different frame configurations of ATVs and other transportable vehicles 110, thereby resulting in a horizontal positioning of the locking bar 56 when installed thereupon.

The apparatus 10 further comprises a mounting plate assembly 200 shown here in a detached state for illustration sake. The mounting plate assembly 200 provides a vertically adjustable means to mount the apparatus 10 to a vertical surface portion of the transporting vehicle 100 such as an inside bed wall of a pickup truck. The mounting plate assembly 200 comprises rugged plated or painted steel plate materials being approximately one-quarter (¼) of an inch thick and further comprises a formed hooking feature 202 along a top edge thereof to secure the mounting plate assembly 200 in position along a top surface of a bed portion of the transporting vehicle 100. The hook feature 202 is envisioned being formed in the mounting plate assembly 200 utilizing common bending or welding processes. The mounting plate assembly 200 further comprises a pair of parallel adjustment slots 204 cut therethrough which allow the locking mechanism assembly 20 to be slidingly positioned vertically so as to conform to various frame heights of transportable vehicles 110. The adjustment slots 204 are approximately one-half (½) inch wide and approximately sixteen (16) inches tall having a center-to-center distance therebetween which corresponds to fastening apertures 54 located at all four (4) corners of the back plate portion 22 of the locking mechanism assembly 20.

In use, common fasteners 120 such as bolts are inserted through the adjustment slots 204 and subsequently through the fastening aperture portions 54 of the locking mechanism assembly 20 and are secured and tightened at a desired height using nut fasteners 160. The mounting plate assembly 200 is envisioned being spaced from the wall of the transporting vehicle 100 approximately one (1) inch using appropriate hardware such as shoulder bolts, set screws, cylindrical spacers and hex bolts, or the like, thereby allowing the aforementioned attaching bolt heads 120 or nut fasteners 160 to move freely up and down along a rear surface during vertical adjustment of the locking mechanism assembly 20. The mounting plate assembly 200 is anchored to the wall portion of the transporting vehicle 100 using fastening apertures 54 and fasteners 120 at each corner location.

Figure 5:
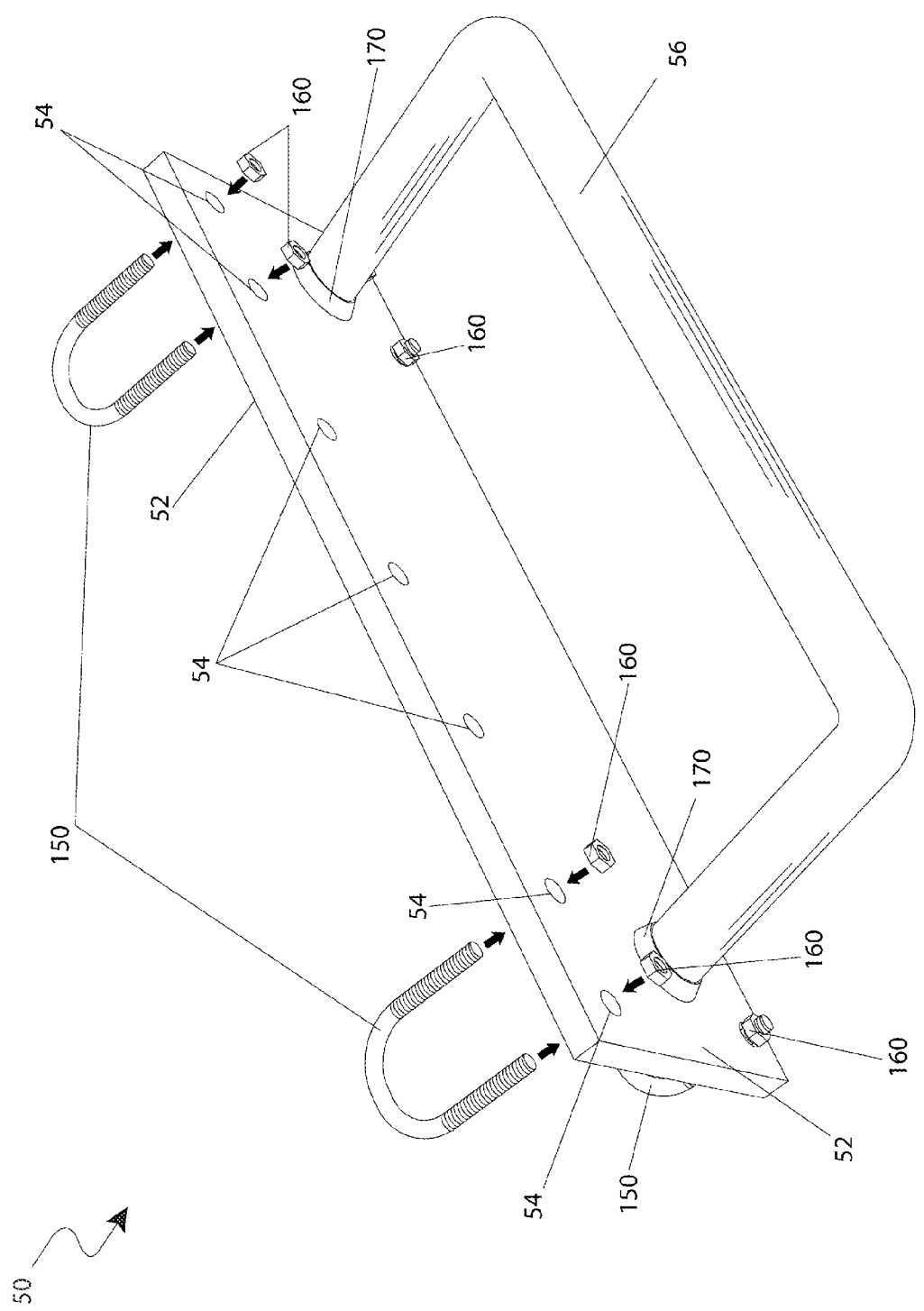

Referring now to FIG. 5 is an exploded view of a locking bar assembly portion 50 of the apparatus 10, according to a preferred embodiment of the present invention, is disclosed. The locking bar assembly 50 comprises a locking bar plate 52, a locking bar 56, a plurality of fastening apertures 54, a pair of "U"-bolts 150, and four (4) common nut fasteners 160. A single horizontal row of equally-spaced fastening apertures 54 are arranged along an upper portion of the locking bar plate 52, thereby enabling attachment to a variety of transportable vehicle 110 frame configurations (see FIG. 3). The locking bar assembly 50, as previously described, is to be introduced in several models having a variety of included angles between the locking bar 56 and the locking bar plate 52 based upon different frame configurations of the transportable vehicle 110.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: procuring a particular model of the apparatus 10 having an application-specific locking bar assembly 50 which fits an anticipated transportable vehicle 110 frame portion; mounting said locking bar assembly 50 securely to said frame portion of said transportable vehicle 110 using pairs of properly spaced fastening apertures 54, two (2) "U"-bolts 150, and nut fasteners 160; attaching a mounting plate assembly 200 to a locking mechanism assembly 20 using provided fasteners 120; hanging and positioning said mounting plate assembly 200 and affixed locking mechanism assembly 20 upon a vertical wall portion of a transporting vehicle 100 using a hook feature portion 202 of said mounting plate assembly 200; positioning said mounting plate assembly 200 at a desired side-to-side position; pre-drilling a wall portion of said transporting vehicle 100 as needed, to secure said mounting plate assembly 200 to said transporting vehicle 100 using said provided fasteners 120; loading and pushing said transportable vehicle 110 onto a bed portion of said transporting vehicle 100 to a location adjacent to said previously mounted locking mechanism assembly 20; adjusting said locking mechanism assembly 20 vertically by slidingly moving said fasteners 120 within adjustment slots 204 so as to align latching slots 31 with a locking bar portion 56 of a locking bar assembly 50; securing said locking mechanism assembly 20 by tightening said fasteners 120; positioning a locking arm 40 at an open state; moving said transportable vehicle 110 forward until obtaining full engagement of said locking bar 56 into said latching slot portions 31 of a pair of side plates 28, 30; pulling said locking arm 40 toward said transportable vehicle 110, thereby pivoting and latching a pair of latch plates 42 around said locking bar 56; installing a padlock, if desired, through a pair of locking apertures 47 to secure said transportable vehicle 110 to said transporting vehicle 100; and, benefiting from increased stability of a transported transportable vehicle 110 while reducing required loading time and effort using the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A latching hitch anchoring apparatus for anchoring a small transportable vehicle to a vertical support, comprising:
   a mounting plate assembly attached to a forward vertical support, said mounting plate assembly comprising a rectangular member which extends downward from a top edge of said vertical support;
   a locking mechanism assembly attached to said mounting plate assembly, said locking mechanism assembly comprising an alignment feature and a latching feature;
   a locking bar assembly attached to a front frame portion of said transportable vehicle, said locking bar assembly comprising a locking bar releasably secured to said latching feature;
   at least four fastening apertures located in respective corners of said rectangular member to attach said mounting plate assembly to said vertical support; and,
   a pair of parallel adjustment slots extending perpendicular to said top edge of said vertical support which align with at least two pairs of opposing fastening apertures located at respective corners of said locking mechanism assembly to attach said locking mechanism assembly to said mounting assembly;
   wherein said pair of adjustment slots provide a means to slidingly adjust a vertical position of said locking mechanism assembly in relation to said vertical support.

2. The apparatus of claim 1, wherein said mounting plate assembly further comprises at least one spacer between a rear surface of said rectangular member and said vertical support to allow a plurality of mechanical fasteners to linearly traverse within said pair of adjustment slots.

3. The apparatus of claim 2, wherein said mounting plate assembly further comprises a hooking feature comprising an L-shaped member perpendicularly affixed to a top edge of said rectangular member for engaging over said top edge of said vertical support.

4. The apparatus of claim 1, wherein said alignment feature further comprises an open-faced five-sided member having a recessed area for receiving said locking bar and at least four fastening apertures which align with said pair of parallel adjustment slots to attach said locking mechanism assembly to said mounting plate assembly.

5. The apparatus of claim 4, wherein said latching feature further comprises:
   a pivot shaft extending a length of and rotatably attached to said five-sided member;
   at least one pair of latching plates perpendicularly affixed to and spaced along said pivot shaft and parallel to one another for releasably securing said locking bar; and,
   a locking arm affixed to an end of said pivot shaft in a substantially perpendicular orientation for rotating said pivot shaft and said at least one pair of latching plates.

6. The apparatus of claim 5, wherein each of said at least one pair of latching plates further comprise hooked ends which rotate upward and downward as said pivot shaft is rotated by said locking arm.

7. The apparatus of claim 6, wherein said alignment feature further comprises a lead-in plate extending inward and downward from a forward edge of a top plate of said five-sided member for providing mechanical guidance to said locking bar during insertion into said recessed area.

8. The apparatus of claim 7, wherein said recessed area further comprises a generally V-shaped latching slot extending inwardly from a forward edge of first and second sidewalls of said five-sided member for guiding said locking bar during insertion and engagement with said latching plates.

9. The apparatus of claim 8, wherein a distal end of said pivot shaft is inserted through a shaft aperture in said first sidewall and a proximal end of said pivot shaft is fit into a shaft notch in said second sidewall, wherein said pivot shaft is removable from said first and second sidewalls.

10. The apparatus of claim 9, wherein said distal end of said pivot shaft is secured to said first sidewall through said shaft aperture by use of a removable fastening pin.

11. The apparatus of claim 10, wherein said proximal end of said pivot shaft is secured to said second sidewall by a retainer plate, said retainer plate comprising a through hole for said pivot shaft to rotatingly protrude;
wherein said retainer plate is attached to said second sidewall and covers said shaft notch.

12. The apparatus of claim 11, wherein said locking mechanism assembly further comprises an elongated security tab affixed to said locking arm adjacent to an exterior surface of said retainer plate, said security tab comprising a locking aperture;
wherein said retainer plate and said second sidewall each further comprise a locking aperture positioned such that all of said locking apertures align when said latching plates and said locking bar are engaged to receive a portable lock.

13. The apparatus of claim 1, wherein said locking bar assembly further comprises a rectangular locking bar plate affixed to said locking bar, said locking bar plate comprising a plurality of equally spaced fastening apertures longitudinally disposed across at least an upper end thereof.

14. The apparatus of claim 13, wherein said locking bar assembly further comprises a plurality of U-bolt fasteners which engage around said front frame portion of said transportable vehicle;
wherein each of said plurality of U-bolt fasteners is insertable through a pair of said plurality of fastening apertures and secured to said locking bar plate.

15. A latching hitch anchoring apparatus for anchoring a small transportable vehicle to a vertical support, comprising:
a rectangular mounting plate attached to a forward vertical support which extends downward from a top edge of said vertical support, said mounting plate comprising:
at least four fastening apertures located in each corner to attach to said vertical support;
a pair of parallel adjustment slots extending perpendicular to said top edge of said vertical support;
at least one spacer between a rear surface and said vertical support to allow a plurality of mechanical fasteners to linearly traverse within said pair of adjustment slots; and,
an L-shaped hooking feature perpendicularly affixed to a top edge for engaging over said top edge of said vertical support;
an open-faced locking mechanism attached to said mounting plate, said locking mechanism comprising:
a top plate, a bottom plate, a first side plate, and a second side plate;
a generally V-shaped latching slot extending inward from a forward edge of said first and second side plates;
a lead-in plate extending inward and downward from a forward edge of said top plate;
at least four fastening apertures which align with said pair of parallel adjustment slots to attach said locking mechanism to said mounting plate;
a pivot shaft rotatingly attached between said first side plate and said second side plate;
a shaft aperture in said first side plate for receiving a distal end of said pivot shaft secured by a removable fastening pin;
a shaft notch in said second side plate for receiving a proximal end of said pivot shaft;
a locking arm affixed to said proximal end of said pivot shaft in a substantially perpendicular orientation for rotating said pivot shaft;
at least one pair of hooked latching plates perpendicularly affixed to and spaced along said pivot shaft which rotate upward and downward as said pivot shaft is rotated by said locking arm; and,
a retainer plate attached to said second side plate and covering said shaft notch having a through hole for said pivot shaft to rotatingly protrude; and,
a locking bar assembly attached to a front frame portion of said transportable vehicle, said locking bar assembly comprising:
a rectangular locking bar plate having a plurality of equally spaced fastening apertures longitudinally disposed across at least an upper end thereof; and,
a locking bar affixed to said locking bar plate;
wherein said at least one pair of latching plates releasably secure said locking bar;
wherein said lead-in plate and said latching slot guide said locking bar during insertion and engagement with said latching plates; and,
wherein said pair of adjustment slots provide a means to slidingly adjust a vertical position of said locking mechanism in relation to said vertical support.

16. The apparatus of claim 15, wherein said locking bar assembly further comprises a plurality of U-bolt fasteners which engage around said front frame portion of said transportable vehicle;
wherein each of said plurality of U-bolt fasteners is insertable through a pair of said plurality of locking bar plate fastening apertures and secured to said locking bar plate.

17. The apparatus of claim 16, further comprising a security tab affixed to said locking arm adjacent to an exterior surface of said retainer plate having a locking aperture;
wherein said retainer plate and said second side plate each further comprise a locking aperture positioned such that all of said locking apertures align when said latching plates and said locking bar are engaged to receive a portable lock.

18. A latching hitch anchoring apparatus for anchoring a small transportable vehicle to a vertical support, comprising:
a mounting plate assembly attached to a forward vertical support, said mounting plate assembly comprising a plurality of fastening features;
a locking mechanism assembly attached to said mounting plate assembly, said locking mechanism assembly comprising an alignment feature and a latching feature; and, a locking bar assembly attached to a front frame portion of said transportable vehicle, said locking bar assembly comprising a locking bar releasably secured to said latching feature;

wherein said alignment feature further comprises an open-faced five-sided member having a recessed area for receiving said locking bar and at least four fastening apertures which align with a pair of parallel adjustment slots in said mounting plate assembly to attach said locking mechanism assembly to said mounting plate assembly.

19. The apparatus of claim 18, wherein said latching feature further comprises:

a pivot shaft extending a length of and rotatably attached to said five-sided member;

at least one pair of latching plates perpendicularly affixed to and spaced along said pivot shaft and parallel to one another for releasably securing said locking bar; and, a locking arm affixed to an end of said pivot shaft in a substantially perpendicular orientation for rotating said pivot shaft and said at least one pair of latching plates.

20. The apparatus of claim 19, wherein said plurality of fastening features of said mounting plate assembly further comprises:

at least four fastening apertures located in respective corners of a rectangular member of said mounting plate assembly to attach said mounting plate assembly to said vertical support; and, a pair of parallel adjustment slots extending perpendicular to a top edge of said vertical support which align with at least two pairs of opposing fastening apertures located at respective corners of said locking mechanism assembly to attach said locking mechanism assembly to said mounting assembly;

wherein said pair of adjustment slots provide a means to slidingly adjust a vertical position of said locking mechanism assembly in relation to said vertical support.

* * * * *